United States Patent
Leskinen

(10) Patent No.: US 9,781,787 B2
(45) Date of Patent: Oct. 3, 2017

(54) VOLTAGE TRANSFORMER MEANT FOR POWER SUPPLY FOR LED LAMPS

(71) Applicant: Kimmo Leskinen, Kaipainen (FI)

(72) Inventor: Kimmo Leskinen, Kaipainen (FI)

( * ) Notice: Subject to any disclaimer, the term of this patent is extended or adjusted under 35 U.S.C. 154(b) by 0 days.

(21) Appl. No.: 15/026,334

(22) PCT Filed: Oct. 1, 2014

(86) PCT No.: PCT/FI2014/000024
§ 371 (c)(1),
(2) Date: Mar. 31, 2016

(87) PCT Pub. No.: WO2015/049415
PCT Pub. Date: Apr. 9, 2015

(65) Prior Publication Data
US 2016/0242248 A1    Aug. 18, 2016

(30) Foreign Application Priority Data
Oct. 2, 2013    (FI) .................................. 20130161 U

(51) Int. Cl.
*H05B 33/08*    (2006.01)
*H02M 7/06*    (2006.01)
(Continued)

(52) U.S. Cl.
CPC .......... *H05B 33/0815* (2013.01); *H02M 7/06* (2013.01); *H02M 7/068* (2013.01);
(Continued)

(58) Field of Classification Search
CPC .......... H01F 30/02; H01F 30/04; H01F 30/12; H01F 30/14; H01F 27/385; H01F 30/10;
(Continued)

(56) References Cited

U.S. PATENT DOCUMENTS 4,296,296 A * 10/1981 Eichelberger ............ H05B 6/68
219/715
4,333,011 A *  6/1982 Mester ..................... H05G 1/46
378/110
(Continued)

FOREIGN PATENT DOCUMENTS

CN    201750345 U    2/2011
JP    S58190000 A    11/1983

OTHER PUBLICATIONS

Hoadley, F. et al: "Comparison of AC to DC rectifier topologies operating on various power distribution networks". Petroleum and Chemical Industry Technical Conference, PCIC 2008. 55th IEEE, Sep. 22, 2008, pp. 1-9.
(Continued)

*Primary Examiner* — Haissa Philogene
(74) *Attorney, Agent, or Firm* — Galbreath Law Offices, P.C.; John A. Galbreath

(57) ABSTRACT

Voltage transformer (A) and rectifier (B1), (B2) meant for power supply for LED lamps wherein the mentioned transformer (A) comprises a three-phase primary winding and at least two three-phase secondary windings wherein the outputs (1u, 1v, 1w) and (2u, 2v, 2w) of the mentioned secondary windings are connected to the rectifiers (B1) and (B2). The secondary windings are divided for several primary windings with various phases and are connected with various connections between outputs of the secondary windings in order to create the desired phase differences or the secondary windings have each their own primary winding wherein the connections between the outputs of the secondary windings have a characteristic, desired phase difference.

5 Claims, 4 Drawing Sheets

(51) Int. Cl.
*H02M 7/219* (2006.01)
*H01F 30/04* (2006.01)
*H02M 1/44* (2007.01)
*H02M 1/12* (2006.01)
*H02M 7/23* (2006.01)
*H02M 1/00* (2006.01)
*H05B 37/02* (2006.01)

(52) U.S. Cl.
CPC ............ *H02M 7/219* (2013.01); *H01F 30/04* (2013.01); *H02M 1/12* (2013.01); *H02M 1/44* (2013.01); *H02M 7/23* (2013.01); *H02M 2001/0077* (2013.01); *H05B 37/02* (2013.01)

(58) Field of Classification Search
CPC ........ H01F 27/42; H01F 27/427; H02M 1/12; H02M 1/44; H02M 7/2173
USPC ........... 336/5, 44, 52; 363/67; 315/276, 278, 315/291, 312; 307/106, 107
See application file for complete search history.

(56) References Cited

U.S. PATENT DOCUMENTS

| | | | | |
|---|---|---|---|---|
| 5,343,080 A * | 8/1994 | Kammeter | ............ | H01F 27/385 307/105 |
| 5,781,428 A * | 7/1998 | Paice | ............ | H01F 30/12 363/126 |
| 8,575,856 B2 * | 11/2013 | Chung | ............ | H05B 33/0818 315/139 |
| 8,737,097 B1 * | 5/2014 | Swamy | ............ | H02M 5/458 363/67 |

OTHER PUBLICATIONS

Singh, B.: "Power quality improvement in load commutated inverter-fed synchronous motor drives". The Institution of Engineering and Technology. IET Power Electronics, Journal Article, May 1, 2010, pp. 411-428.

* cited by examiner

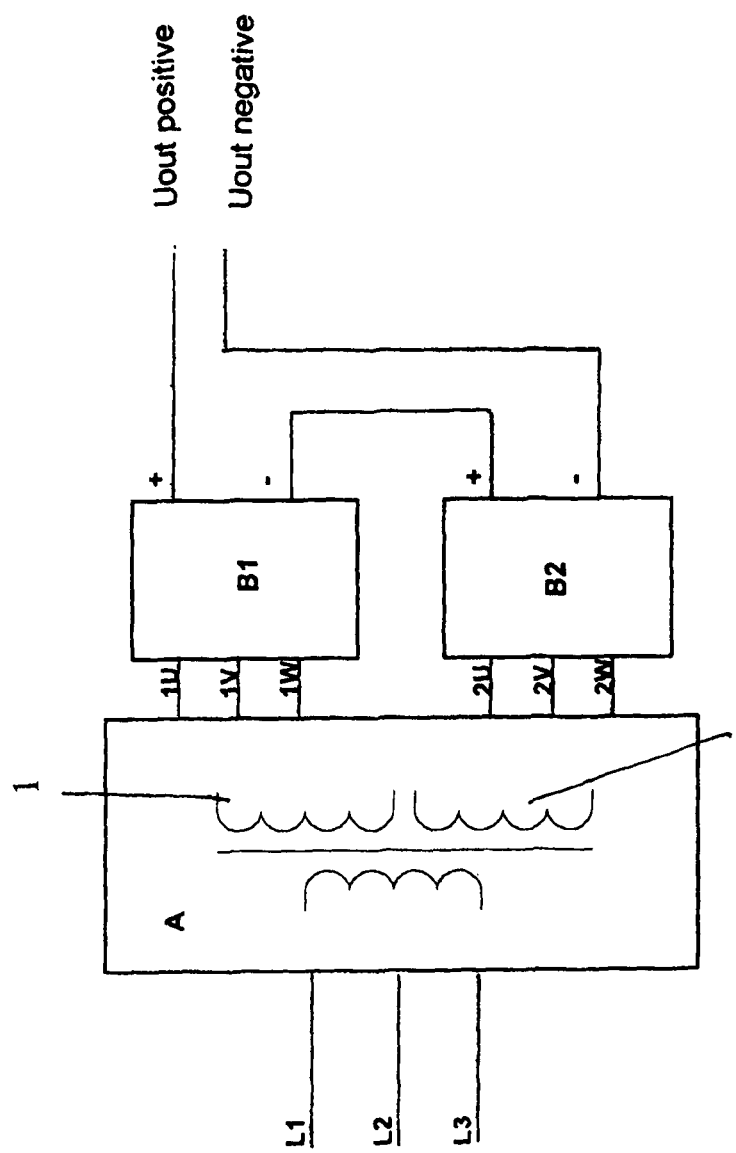

US 9,781,787 B2

VOLTAGE TRANSFORMER MEANT FOR POWER SUPPLY FOR LED LAMPS

FIELD OF THE INVENTION

Invention relates to a voltage transformer and a rectifier meant for power supply for LED lamps wherein the transformer comprises a three-phase primary winding and at least two three-phase secondary windings, wherein the outputs of the mentioned secondary windings are connected to rectifiers.

BACKGROUND OF THE INVENTION

LED lamps are becoming more common. One known disadvantage is the fact that LED lamps can cause electromagnetic disturbances. The reason for these disturbances is mostly the power source of the LED lamp which power source is nowadays nearly always a step down switching power supply. The power source in question breaks fast mains voltage (about 320-340V) which is rectified with a diode bridge and filtered with capacitors mostly at the frequency of 50 kHz-500 kHz. This causes a strong electromagnetic radiation to the environment which radiation typically disturbs the listening of radio and watching of TV programmes. In the worst cases the power sources disturb even each other's functioning. In addition to this the input current and the input voltage have various phases in the power source in question which causes unpaired harmonic waves to the electrical network which harmonic waves disturb the functioning of other devices that are connected to the electrical network.

SUMMARY OF THE INVENTION

In order to remove the above mentioned disadvantages a new transformer meant for power feed of LED lamps has been developed with which transformer the disturbances caused by the known transformers and voltage variations can be avoided. It is characteristic of the transformer according to the invention that secondary windings are divided for several primary windings with various phases and are connected with various connections between the outputs of the secondary windings in order to create the desired phase differences or the secondary windings have each their own primary winding in which case the connections between the outputs of the secondary windings have a characteristic, desired phase difference.

The power source according to the invention which is suitable for LED illumination can be realized with a help of a 12-pulse transformer which is for example D0/y11n and D0/d0 (400V/50V) being wound around the same core. The primary winding is connected to a delta (D0). The phase difference between the star (yn11) and delta (d0) connections being located in the secondary winding is 30 degrees. When both these are rectified with a conventional 3-phase rectification and the outputs are connected in series or in parallel, a 12-pulse rectified output can be achieved in which output the frequency of the ripple (disturbance voltage) of the output voltage is 600 Hz. For example the ripple voltage of the output voltage of the 12-pulse transformer, which feeds 50V and 50 A, is approximately 2V. This kind of voltage is very suitable for controlling LED lamps even without capacitors that equalize the voltage.

Additionally in the rectification process in the secondary windings the harmonic waves 3, 5, 7 and 9 of the forepart, which are created in the load situation and which cause most disturbance, are summed to be zero when there is a 30 degree phase difference between the secondary windings.

In a corresponding way 18- and 24-pulse transformers can be realized by adding secondary windings and by adjusting the phase difference of the secondary windings. There are three separate secondary windings in the 18-pulse transformer the mutual phase difference of which secondary windings is 20 degrees and there are four secondary windings in the 24-pulse transformer the mutual phase difference of which secondary windings is 15 degrees. The rectified voltages and the summing of their output voltages are realized in the same way as in the 12-pulse transformer.

Advantages: cost-effectiveness and no disturbances. Does not cause disturbances into the feeding electrical network and does not cause electromagnetic disturbance radiation to the environment. Contains very little amount of components which have a simple structure and are durable, in other words MTBF is naturally very long.

BRIEF DESCRIPTION OF THE DRAWINGS

In the following the invention is described more detailed by referring to the accompanying drawings in which FIG. 1 shows schematically A 12-pulse transformer.

DETAILED DESCRIPTION OF THE PREFERRED EMBODIMENT

In the FIG. 1 the incoming phases L1, L2 and L3 are connected to the delta (D0) in the primary winding of the transformer. The input voltage is 400V AC. The first secondary winding 1 is connected to the star yn11 and the output voltage is 40.6 VAC. The second secondary winding 2 is connected to the delta d0 and the output voltage is also 40.6 V AC.

The output voltages 1U, 1V and 1W of the first secondary winding 1 are directed to the rectifier B1 the rectified output voltage of which rectifier is 57.5 V DC. The output voltages 2U, 2V and 2W of the second secondary winding 2 are directed to the rectifier B2 the rectified output voltage of which rectifier is also 57.5 DC.

The outputs of the bridge rectifiers B1 and B2 can be connected either in parallel or in series. In the FIG. 1 the outputs are connected in series in which case the summed voltage will be 115 V DC which summed voltage contains a disturbance voltage (ripple) that is approximately 2V at the frequency of 600 Hz. In this connection the voltage doubles itself and the current stays the same. In the presentation of the FIG. 1 a 12-pulse transformer is shown.

If the outputs of the rectifiers B1 and B2 are connected in parallel, one gets a power source the output voltage of which power source is 63V DC and the amplitude of the ripple voltage is 2V at the frequency of 600 Hz. In this connection the voltage stays the same and the current doubles itself.

Figure 2A:
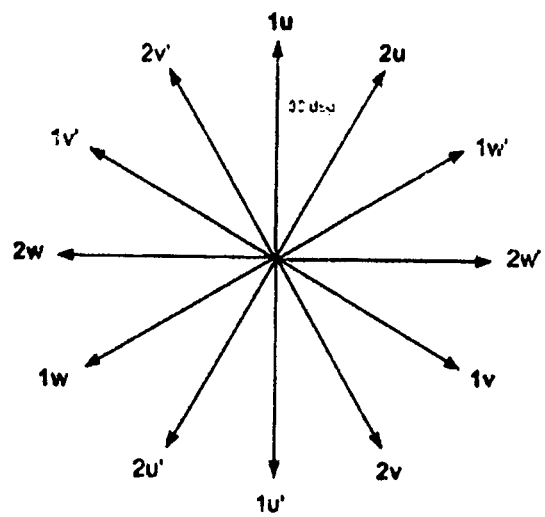
FIGS. 2A-C show schematically the phase vectors as a vector diagram of the 12-, 18- and 24-pulse transformers.
Figure 3A:
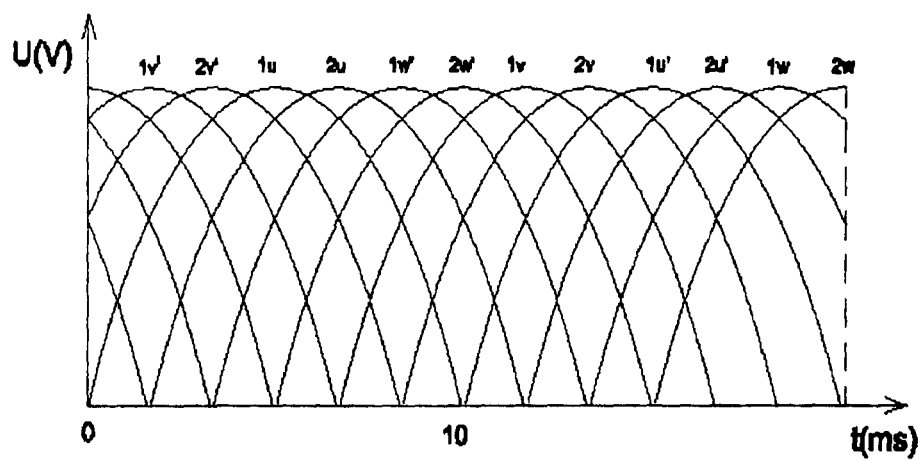
FIGS. 3A-C show the envelopes of the secondary windings of the 12-, 18- and 24-pulse transformers.

The FIG. 2A shows a vector diagram of the 12-pulse transformer which diagram shows the phase differences of the voltages coming from the secondary windings 1 and 2 of the FIG. 1 and the vectors of various phases. In the figure FIG. 3A rectified sinusoidal envelopes of various secondary windings and phases of the same 12-pulse transformer are shown.

Figure 2B:
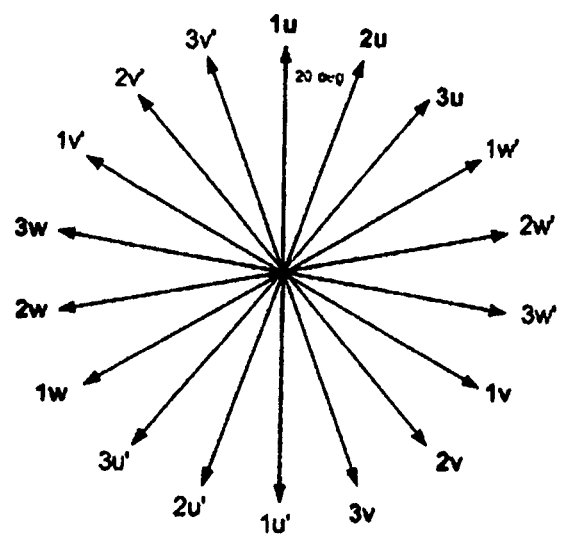
Figure 3B:
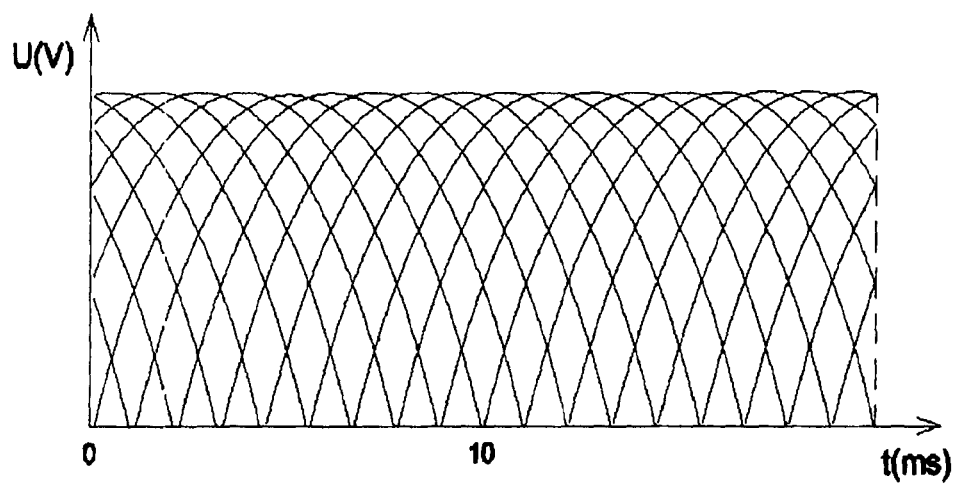

In the figures FIG. 2B and FIG. 3B a corresponding diagram and an envelope of the 18-pulse transformer are shown the frequency of the output and the ripple voltage of which pulse transformer is 900 Hz. The amplitude of the disturbance has the class 1.5V.

Figure 2C:
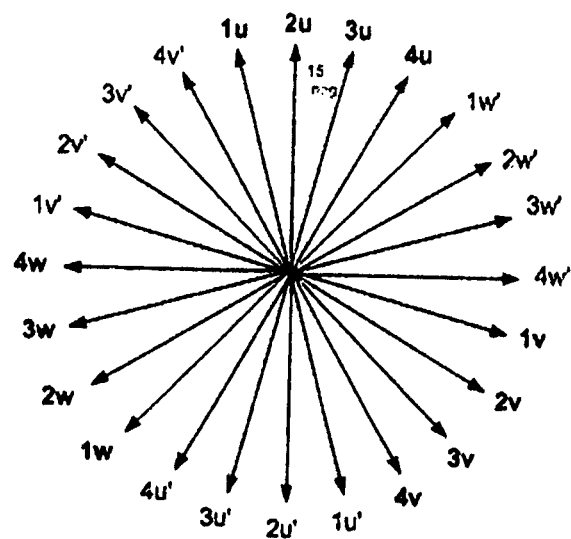
Figure 3C:
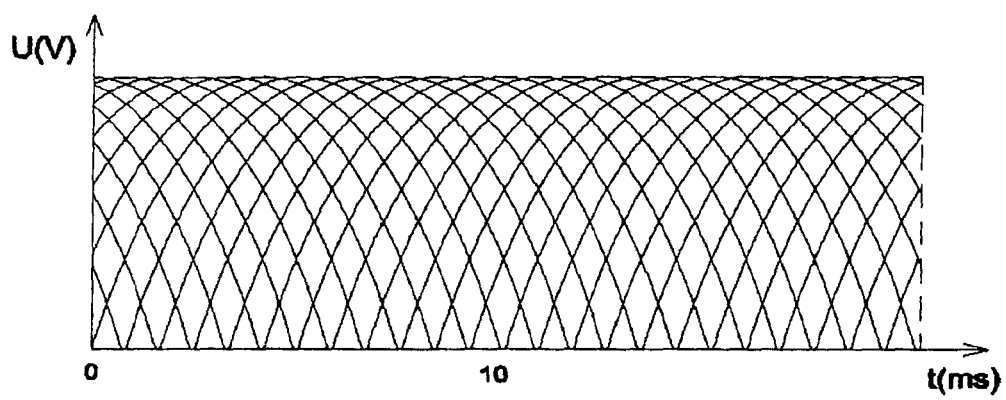

In the figures FIG. 2C and FIG. 3C the same diagram and the envelope of the 24-pulse transformer are shown the frequency of the output and the ripple voltage of which pulse transformer is 1200 Hz. The amplitude of the disturbance has the class 1 V.

The more pulses the transformer creates, the greater the frequency of the ripple voltage is and at the same time the amplitude of the ripple voltage reduces. Both improve the features of the pulse transformer as a power source of LED illumination.

The primary winding of the transformer can be connected either to the delta or to the star. The secondary windings for their part can be partly connected to the delta and partly to the star. It is characteristic of the invention that when one wants to have a transformer that creates more than 12 pulses that each secondary winding is divided for several primary windings, most advantageously for two in such a way that one achieves equidistant phase differences for the rectified pulses that are created in the connection.

The invention claimed is:

1. Voltage transformer (A) and rectifiers (B1), (B2) meant for power feed of LED lamps said voltage transformer comprises a three-phase primary winding and at least two three-phase secondary windings wherein the outputs (1u, 1v, 1w) and (2u, 2v, 2w) of said secondary windings are connected to the rectifiers (B1) and (B2), wherein the secondary windings are divided for several primary windings with various phases and are connected with various connections between outputs of the secondary windings in order to create desired phase differences or the secondary windings have each their own primary winding wherein the connections between the outputs of the secondary windings have a characteristic, desired phase difference, and wherein by means of said voltage transformer and rectifiers (B1) and (B2) a directed voltage (Uout) is produced as output.

2. Voltage transformer (A) and rectifier (B1), (B2) according to the claim 1, wherein the phases (L1, L2, L3) of the primary winding are connected in delta and the secondary windings are connected in delta and in star.

3. Voltage transformer (A) and rectifier (B1), (B2) according to the claim 1, wherein the phases (L1, L2, L3) of the primary winding are connected in star and the secondary windings are connected in delta and in star.

4. Voltage transformer (A) and rectifier (B1), (B2) according to the claim 1, wherein outputs are arranged in various amounts, such as 6, 9 or 12 by adding secondary windings wherein between them pulses which are at a different phase are created correspondingly 12, 18 or 24/supply frequency of the primary winding and the phase differences between which pulses are correspondingly 30°, 20° or 15°.

5. Voltage transformer (A) and rectifier (B1), (B2) according to the claim 1, wherein the amount of the secondary windings is chosen to be greater than 4 in order to create a greater amount of pulses than 24.

* * * * *